US010807866B2

(12) United States Patent
Alexander et al.

(10) Patent No.: US 10,807,866 B2
(45) Date of Patent: Oct. 20, 2020

(54) WATER-GAS SHIFT CATALYST

(71) Applicant: JOHNSON MATTHEY PUBLIC LIMITED COMPANY, London (GB)

(72) Inventors: Anne-Marie Christina Alexander, Cleveland (GB); Matthew John Cousins, Cleveland (GB); Michele Marigo, Cleveland (GB); Nicola Campbell McKidd, Cleveland (GB); William Maurice Sengelow, Cleveland (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/771,416

(22) PCT Filed: Oct. 14, 2016

(86) PCT No.: PCT/GB2016/053183
§ 371 (c)(1),
(2) Date: Apr. 27, 2018

(87) PCT Pub. No.: WO2017/072481
PCT Pub. Date: May 4, 2017

(65) Prior Publication Data
US 2018/0327259 A1 Nov. 15, 2018

(30) Foreign Application Priority Data
Oct. 29, 2015 (GB) .................................. 1519133.1
Jun. 23, 2016 (GB) .................................. 1610989.4

(51) Int. Cl.
*C01B 3/16* (2006.01)
*B01J 23/78* (2006.01)
(Continued)

(52) U.S. Cl.
CPC ............... *C01B 3/16* (2013.01); *B01J 23/745* (2013.01); *B01J 23/78* (2013.01); *B01J 23/868* (2013.01);
(Continued)

(58) Field of Classification Search
CPC ...................................................... B01J 23/78
See application file for complete search history.

(56) References Cited

U.S. PATENT DOCUMENTS 3,922,337 A 11/1975 Campbell et al.
4,328,130 A 5/1982 Kyan
(Continued)

FOREIGN PATENT DOCUMENTS

DE 3819436 12/1989
EP 1487578 12/2004
(Continued)

OTHER PUBLICATIONS

PCT/GB2016/053183 International Search Report dated Jan. 3, 2017.
(Continued)

*Primary Examiner* — Douglas B Call
(74) *Attorney, Agent, or Firm* — BakerHostetler

(57) ABSTRACT

A catalyst precursor, suitable for use after reduction as a water-gas shift catalyst, is described, which is in the form of a pellet comprising one or more oxides of iron, wherein the catalyst precursor has a pore volume 0.30 cm³/g and an average pore size in the range 60 to 140 nm The precursor may be prepared by calcination of precipitated iron compounds at temperatures in the range 400-700° C.

32 Claims, 2 Drawing Sheets

Figure 1:
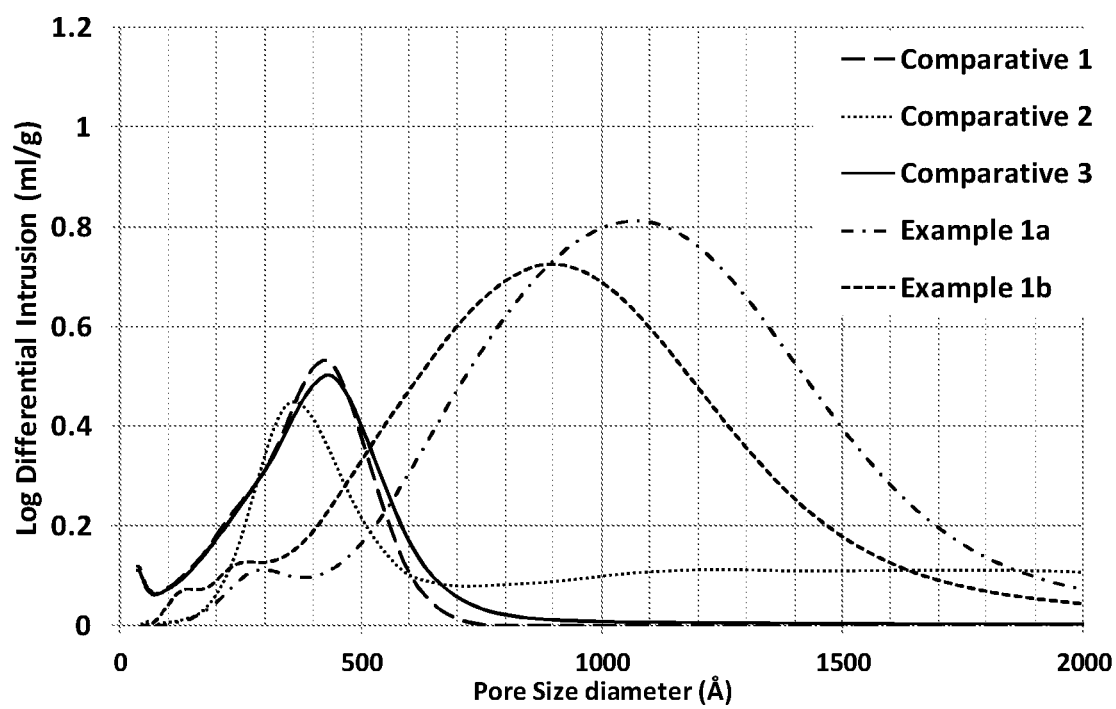

(51) Int. Cl.
*B01J 35/10* (2006.01)
*C01G 45/02* (2006.01)
*C01G 37/02* (2006.01)
*C01F 7/02* (2006.01)
*C01F 5/02* (2006.01)
*C01G 49/06* (2006.01)
*C01G 3/02* (2006.01)
*C01G 49/02* (2006.01)
*B01J 23/86* (2006.01)
*B01J 23/745* (2006.01)
*B01J 37/00* (2006.01)
*B01J 37/03* (2006.01)
*C01B 32/50* (2017.01)
*C01G 49/08* (2006.01)

(52) U.S. Cl.
CPC ....... *B01J 35/1066* (2013.01); *B01J 37/0009* (2013.01); *B01J 37/031* (2013.01); *C01F 5/02* (2013.01); *C01F 7/02* (2013.01); *C01G 3/02* (2013.01); *C01G 37/02* (2013.01); *C01G 45/02* (2013.01); *C01G 49/02* (2013.01); *C01G 49/06* (2013.01); *C01B 32/50* (2017.08); *C01G 49/08* (2013.01); *C01P 2006/14* (2013.01); *C01P 2006/16* (2013.01); *Y02P 20/52* (2015.11)

(56) References Cited

U.S. PATENT DOCUMENTS

| | | | |
|---|---|---|---|
| 4,499,203 | A | 2/1985 | Toulhoat et al. |
| 4,721,611 | A | 1/1988 | Pinto et al. |
| 5,656,566 | A | 8/1997 | Ward |
| 6,384,126 | B1 | 5/2002 | Pirtle et al. |
| 9,751,039 | B2 | 9/2017 | Gebald et al. |
| 2003/0026747 | A1 | 2/2003 | Zhu et al. |
| 2006/0233687 | A1 | 10/2006 | Hojlund Nielsen |
| 2008/0257147 | A1 | 10/2008 | Gregory |
| 2009/0152500 | A1 | 6/2009 | Chen et al. |
| 2011/0166013 | A1 | 7/2011 | Cairns et al. |
| 2012/0202681 | A1 | 8/2012 | Park et al. |
| 2012/0214881 | A1 | 8/2012 | Wahlstrom et al. |
| 2012/0223274 | A1* | 9/2012 | Hinton ............ C01B 3/16 252/373 |
| 2012/0232322 | A1 | 9/2012 | Wilson et al. |
| 2014/0115955 | A1* | 5/2014 | McNeff .......... C10L 3/08 44/437 |
| 2016/0074844 | A1* | 3/2016 | Freer ............. B01J 35/12 585/658 |

FOREIGN PATENT DOCUMENTS

| | | |
|---|---|---|
| EP | 2049249 | 4/2009 |
| EP | 2141118 A1 | 1/2010 |
| EP | 2237882 | 10/2010 |
| EP | 2240273 | 10/2010 |
| EP | 2323762 | 5/2011 |
| EP | 2442904 | 4/2012 |
| EP | 2599541 | 6/2013 |
| EP | 2924002 | 9/2015 |
| GB | 940960 | 11/1963 |
| GB | 1087987 | 10/1967 |
| GB | 1131631 | 10/1968 |
| GB | 1213343 | 11/1970 |
| GB | 1323064 | 7/1973 |
| GB | 1357335 | 6/1974 |
| GB | 2288341 | 10/1995 |
| WO | WO 2003/002452 A1 | 1/2003 |
| WO | WO 2003/082468 A1 | 10/2003 |
| WO | WO 2008/012255 A2 | 1/2008 |
| WO | WO 2009/076119 A1 | 6/2009 |
| WO | WO 2009/078979 A2 | 6/2009 |
| WO | WO 2010/028324 A2 | 3/2010 |
| WO | WO 2010/029323 A1 | 3/2010 |
| WO | WO 2010/029324 A1 | 3/2010 |
| WO | WO 2010/029325 A1 | 3/2010 |
| WO | WO 2010/045232 A2 | 4/2010 |
| WO | WO 2010/146379 A1 | 12/2010 |
| WO | WO 2010/146380 A1 | 12/2010 |
| WO | WO 2011/055132 A1 | 5/2011 |
| WO | 2014/170184 A1 | 10/2014 |
| WO | WO 2015/007322 A1 | 1/2015 |

OTHER PUBLICATIONS

PCT/GB2016/053183 IWritten Opinion dated Jan. 3, 2017.
GB1617427.8 Combined Search and Examination Reprot under Sectoins 17 and 18(3) dated May 10, 2017.
GB1610989.4 Search Report Under Section 17(5) dated Mar. 15, 2017.

* cited by examiner

WATER-GAS SHIFT CATALYST

CROSS-REFERENCE TO RELATED APPLICATIONS

This application is the National Stage of International Patent Application No. PCT/GB2016/053183, filed Oct. 14, 2016, which claims priority from Great Britain Patent Application No. 1519133.1, filed Oct. 29, 2015, and Great Britain Patent Application No. 1610989.4, filed Jun. 23, 2016, the disclosures of each of which are incorporated herein by reference in their entireties for any and all purposes.

This invention relates to water-gas shift catalysts and in particular to iron-oxide water gas shift catalysts suitable for high temperature shift processes.

The water gas shift process is well established as a means to increase the hydrogen content and/or reduce the carbon monoxide content of synthesis gases produced by steam reforming, partial oxidation and gasification of hydrocarbon and carbonaceous feedstocks. The reaction may be depicted as follows.

$$H_2O + CO \leftrightarrow H_2 + CO_2$$

The reaction is mildly exothermic and a favourable equilibrium is obtained at low temperatures. To achieve acceptable conversion however, iron-containing catalysts have found widespread use as so-called high-temperature-shift (HTS) catalysts. Typically, iron-containing HTS catalyst precursors are prepared in which the iron is present as haematite ($Fe_2O_3$) and prior to use for the water-gas shift reaction, the catalyst precursors are subjected to reduction conditions wherein the haematite is reduced to magnetite ($Fe_3O_4$). This reduction is often carried out in-situ, i.e. in the reactor wherein the water-gas shift reaction is to be effected.

U.S. Pat. No. 5,656,566 discloses catalyst precursor pellets, suitable for use, after reduction, as high temperature shift catalysts, comprising oxides of iron and chromium and including particles having an aspect ratio of at least 2 and an average (by weight) maximum dimension of at least 500 nm. The particles are preferably acicular and particularly are acicular iron oxide, alumina, or zinc oxide particles. The catalysts were prepared by co-precipitation of iron, copper and chromium nitrates with a sodium carbonate solution, with inclusion of acicular particles in the sodium carbonate solution or precipitate, and by drying and calcining the composition at 150° C.

The volume and choice of water-gas shift catalysts depends on the required limit for carbon monoxide in the product gas stream and also the impurities that are present. The bed size is governed by these limits and the required life time, which makes most HTS catalyst vessels relatively large. Industrial water-gas shift catalysts are based on pellets with a simple cylindrical shape. Operators of water gas shift processes therefore face the problem of trading off activity from smaller pellets at the cost of increased pressure drop, or decreased pressure drop at the cost of decreased performance.

U.S. Pat. No. 4,328,130 discloses a shaped catalyst in the form of a cylinder with a plurality of longitudinal channels extending radially from the circumference of the cylinder and defining protrusions there-between, wherein the protrusions have a maximum width greater than the maximum width of the channels. The catalysts depicted have 2, 3 or 4 truncated-V shaped channels.

WO2010/029325 discloses a catalyst unit in the form of a cylinder having a length C and diameter D, wherein the exterior surface of the unit has two or more flutes running along its length, said cylinder having domed ends of lengths A and B such that (A+B+C)/D is in the range 0.50 to 2.00, and (A+B)/C is in the range 0.40 to 5.00.

Whereas these catalysts offer improved geometric surface area, they do not solve the problems associated with large beds of water-gas shift catalysts.

In addition, conventional iron-based HTS catalysts have a limit on the size and constraints on the shape imposed by the strength of the materials.

There is also a desire to reduce the amount or remove the chromium oxide content of HTS catalysts to avoid exposure, during manufacture, to harmful Cr(VI) materials.

This invention seeks to overcome the limitations of the current materials. We have found that catalyst precursors having a different pore structure have enhanced properties, when reduced to form catalysts for the water-gas shift reaction.

Accordingly, the invention provides a catalyst precursor, suitable for use after reduction as a water-gas shift catalyst, in the form of a pellet comprising one or more oxides of iron, wherein the catalyst precursor has a pore volume ≥0.30 $cm^3/g$ and an average pore size in the range 60 to 140 nm.

The invention further provides a method for preparing the catalyst precursor comprising the steps of:
(i) adding a solution comprising one or more iron salts to a solution comprising an alkali metal carbonate to form a suspension comprising precipitated iron compounds, until the pH of the suspension is in the range 2-5,
(ii) adding an alkaline compound to the suspension comprising precipitated iron compounds to raise its pH to ≥7,
(iii) separating the precipitated iron compounds from the suspension,
(iv) washing the separated precipitated iron compounds to remove residual alkali metal salts,
(v) drying the washed precipitate, and either
(vi) shaping the dried material by pelleting to form a pellet and then calcining the pellet, or, calcining the dried material and then shaping the calcined material by pelleting to form a pellet, wherein the calcining step is performed at a temperature in the range 400-700° C.

The invention further provides a water gas shift catalyst obtained by reduction of the one or more iron oxides in the catalyst precursor.

The invention further provides a process for increasing the hydrogen content of synthesis gas mixture comprising hydrogen, carbon oxides and steam, comprising the step of passing the synthesis gas mixture at an inlet temperature in the range 280-500° C. over the water-gas shift catalyst to form a hydrogen-enriched shifted gas mixture.

The catalyst precursor comprises one or more iron oxides, typically haematite $Fe_2O_3$. Preferably essentially all of the iron oxides are present as haematite. The catalyst precursor may further comprise one or more metal oxides selected from chromia, alumina, zinc oxide, manganese oxide, magnesium oxide and copper oxide. The catalyst precursor preferably has an iron oxide content (expressed as $Fe_2O_3$) of 60 to 95% by weight. The amount of chromium, copper, manganese, magnesium or zinc in the calcined shaped catalyst precursor (expressed as $Cr_2O_3$ or MO, where M is Cu, Mn, Mg or Zn) may be in the range 0 to 20% by weight, preferably in the range 1-10% by weight. If included, the amount of aluminium in the shaped catalyst precursor (expressed as $Al_2O_3$) may be in the range 0 to 30% by weight, preferably 3 to 20% by weight, more preferably 3 to 10% by weight.

The catalyst precursor has a pore volume ≥0.30 cm³/g and an average pore size in the range 60 to 140 nm (600 to 1400 Angstroms). The average pore size may in particular be in the range 80-120 nm. By pore size we mean the pore cross-sectional opening, which may conveniently be expressed as an equivalent pore diameter. Thus pore size may equated to pore diameter. The pore volume and average pore size or diameter of the catalyst precursors of the present invention are significantly higher than those of the prior art high temperature shift materials, which typically have a pore volume <0.3 ml/g and an average pore diameter in the range 350-450 Angstroms (35-45 nm). Thus in the present invention preferably ≥50%, more preferably ≥60% of the pores have a pore size ≥60 nm (600 angstroms) and/or ≤40% of the pores have a pore size ≤60 nm (600 angstroms). At higher temperatures, e.g. ≥400° C., the water-gas shift reaction may become diffusion-limited. The catalysts of the present invention, having larger pore sizes, overcome the diffusion limitations of the prior art catalysts, thereby providing higher activity. The pore volume and pore size distribution of the catalyst precursor may be determined by mercury porosimetry, which is a well-established technique, described for example by ASTM method D4284.

The pellets of the catalyst precursor have a lower weight loss on ignition, typically <3% compared to the prior art un-calcined catalysts, and the volume shrinkage on reduction is lower, typically <1.5%. This has the advantage that that the reactor volumes may be more effectively utilised, and/or smaller reactors may be used. The catalyst precursors also retain a significant proportion, e.g. 40% or higher, of their crush strength upon reduction compared to the un-calcined catalysts. This has the advantage that the risk of increased pressure drop in the bed of catalyst by breakage of the catalyst pellets is reduced compared to the un-calcined catalysts The catalyst precursor is in the form of pellets formed by pelleting a powdered composition. Preferably the pellet is cylindrical with a length C, a diameter D, and more preferably has two or more flutes running along its length. Particularly preferred pellets have domed ends of lengths A and B, wherein (A+B+C)/D is in the range 0.25 to 1.25 and (A+B)/C is in the range 0.03 to 0.3. The aspect ratio of the cylindrical pellet, which may be defined as overall length divided by the diameter, i.e. (A+B+C)/D is in the range 0.25 to 1.25, preferably 0.5 to 1.0, more preferably 0.55 to 0.70 and especially 0.55 to 0.66.

Both ends of the pellet may be domed. The domed ends have lengths A and B, which may be the same or different but are preferably the same. The dome ratio to the cylindrical part of the pellet (i.e. (A+B)/C) is in the range 0.03 to 0.3, preferably 0.05 to 0.25 and more preferably 0.10 to 0.25. This dome size has been found most suitable when combined with the flutes for the water-gas shift catalysts.

The length of the cylindrical portion, C, is preferably in the range 2.5 to 6 mm, more preferably 3 to 5 mm and the diameter, D, is preferably in the range 5 to 10 mm, more preferably 7 to 9 mm. The heights of the domed ends, A and B, are preferably each 0.1 to 0.5 mm, especially 0.2 to 0.3 mm.

The cylindrical pellet may have two or more flutes running along its length. The words "flute" and "channel" may be used interchangeably. The flutes may be curved or straight or a combination thereof. Preferably the flutes are straight and run axially along the exterior of the cylindrical pellet as this simplifies fabrication. The shape of the flutes may be semi-circular, elliptical, U-shaped, V-shaped, Π-shaped or a variant of these. Semi-circular, elliptical and U-shaped flutes are preferred as these offer improved the strength of the resulting pellets compared to other designs.

The catalyst pellet may have between 2 and 12 or more flutes, which desirably are preferably symmetrically positioned, i.e. equally spaced around the circumference of the pellet. 3-7 flutes, particularly 3, 4 or 5 flutes or channels are preferred. 5 flutes are especially preferred. Where the flutes are semi-circular, elliptical or U-shaped, they may independently have a width d" in the range of 0.1 D to 0.4 D. In particular we have found that flute widths of 0.1 D to 0.25 D are preferred when 5 or more flutes are present, flute widths of 0.2-0.3 D are preferred when 4 flutes are present and flute widths of 0.25-0.4 D are preferred when 3 flutes are present. Flute widths may be in the range 1 to 3 mm. Flute depths are preferably in the range 0.5 to 1.5 mm.

We have found particularly that it is desirable to limit the total flute width, i.e. the combined opening, to ≤35% of the circumference of the cylinder, i.e. ≤0.35(πD), as this prevents undesirable interlocking of adjacent pellets in a catalyst bed. Interlocking can reduce flow but also can give rise to broken catalyst.

The flutes may if desired have rounded edges. This reduces interlocking and removes sharp edges that may otherwise be susceptible to attrition. Both interlocking and attrition give rise to the formation of fines and/or broken catalyst pellets that reduce the effectiveness of the catalyst and increase pressure drop through the catalyst bed. The rounded edges may have a radius in the range 0.03 D to 0.09 D.

The pellet in the present invention desirably has no through-holes as this reduces the strength of the resulting catalyst both before, and especially after, reduction.

If desired, one or both domed ends may be positioned to provide a lip on one or both ends of the cylinder portion of the pellet to improve the pellet fabrication. The width, w', of the lip may be in the range 0.2 to 1.0 mm.

The fluted shaped catalyst pellets offer process improvements including an activity increase in high temperature shift of over 4% and a decrease in pressure drop of greater than 10% compared to commercially available cylindrical catalysts. The domed fluted pellets have surprisingly also been found better able to withstand stresses imposed during the calcination step than corresponding cylindrical pellets.

The catalyst precursor is prepared by steps including the precipitation of iron compounds from a solution of one or more iron salts by adding it to a solution of an alkali metal carbonate until the pH is in the range 2-5, followed by adjustment of the pH with an alkaline compound to ≥7.

In the conventional production route for iron oxide, the solution of the iron salts used in the precipitation is generally an aqueous solution of sulphates. However, in a high temperature shift catalyst operated upstream of copper-containing catalysts, the presence of sulphur is undesirable as it may poison the downstream catalysts. Therefore in the present method, precipitation of the iron compounds from a solution of one or more iron nitrates is preferable. Accordingly, preferably the iron salt comprises iron (II) nitrate, iron (Ill) nitrate or a mixture thereof. The concentration of iron in the solution of one or more iron salts may usefully be in the range 10-20% w/v. Aqueous solutions are preferred.

The catalyst precursor may also comprise one or more metal oxides selected from chromia, alumina, zinc oxide, manganese oxide, magnesium oxide and copper oxide. In the present method, the chromium, copper, manganese, magnesium zinc and/or aluminium may be introduced into the catalyst precursor by co-precipitation with the iron compounds. Hence in a preferred embodiment the solution of one or more iron salts may further comprise a chromium, copper, manganese, magnesium, zinc or aluminium salt. The concentration of chromium, copper, manganese, magnesium, zinc or aluminium in solution may usefully be in the range 1-20% w/v. For the same reasons as the one or more iron salts, the chromium, copper, manganese, magnesium zinc or aluminium salt in solution with the one or more iron salts is preferably a nitrate.

If desired, the iron salt solution may further include an acid, such as nitric acid, sufficient to lower the pH to ≤5 during the precipitation but this is not usually necessary.

A particulate support material may be included in the iron salt solution. Alternatively, the particulate support material may instead be added to or included in the alkali metal carbonate solution. The particulate support material may be selected from metal oxide or metal hydroxide particles. The metal oxide or metal hydroxide particles may become coated during the precipitation and so function to support the precipitated iron compounds. The support material is preferably selected from alumina, aluminium trihydrate, boehmite, zinc oxide, iron (III) oxide, iron (III) oxyhydroxide and iron hydroxide. The support particles may be spherical or may have an aspect ratio of at least 2 and an average length within the range 500 to 1500 nm. In particular there may be used spherical goethite (FeOOH) particles or acicular alumina particles, e.g. acicular boehmite (AlOOH), or, preferably, acicular iron oxide, or oxyhydroxide, particles, e.g. acicular haematite ($Fe_2O_3$) or goethite (FeOOH) particles. Alternatively, suitable plate-like iron oxide particles may be made by rapidly oxidising ferrous hydroxide. Plate-like aluminium monohydrate (boehmite) particles may also be used. The support particles preferably have a BET surface area of at least 5 $m^2/g$, and in particular in the range 8 to 20 $m^2/g$.

The alkali metal carbonate may usefully comprise sodium or potassium carbonate, sodium or potassium hydrogen carbonate, or a mixture thereof. The solution of alkali metal carbonate is preferably saturated, but useful solutions may comprise 20-35% w/v alkali metal carbonate. The solution of alkali metal carbonate may be heated to a temperature in the range 20-90° C.

The iron salt solution is added to the alkali metal carbonate solution causing a precipitation of iron compounds initially under alkaline conditions to form a suspension. The suspension is preferably agitated or stirred throughout the precipitation and during the subsequent pH adjustment. The pH of the suspension drops during the precipitation and the addition of iron salt solution should be continued until the pH is in the range 2 to 5, preferably in the range 2 to 4, more preferably 2.5 to 4.0, most preferably 2.9-3.5, especially 3.0-3.4, e.g. 3.2. At a pH below 2, the Applicant has found surprisingly that the resulting catalyst precursor does not have the desired pore volume or average pore size. Before the alkaline compound is added, the suspension at a pH in the range 2 to 5 may be mixed for a period of 0.5 to 5 hours to allow the precipitate to homogenize.

An alkaline compound is then added to the suspension to raise the pH to ≥7, preferably 7 to 10, more preferably 7.0 to 9.0, most preferably 7.0 to 8.0, especially 7.0 to 7.4, e.g. 7.2. The alkaline compound may usefully comprise an alkali metal hydroxide, preferably sodium hydroxide or potassium hydroxide. The alkaline compound may be added as a solid but is more conveniently added as an aqueous solution.

The Applicant has found pH control to be very important in ensuring the iron compounds with the desired porosity properties are obtained. Without wishing to be bound by theory, in the present invention, control of the pH during addition of the iron solution to the alkali metal carbonate solution and then pH adjustment may be used to provide "carbonate-rich" precipitate materials, which upon subsequent calcination produce the distinct pore structures of the catalyst precursors.

The resulting precipitate containing iron compounds may be separated and recovered, for example by filtration or by centrifuge, and washed to reduce the alkali metal content. The washing is preferably performed with water, conveniently mains water, de-mineralized water or equivalent, using conventional methods. The washing step may be performed to reduce the alkali metal content (expressed as alkali metal oxide) of the dried precipitate to ≤1.0%, preferably ≤0.5%, more preferably ≤0.25% by weight.

The washed precipitate may then be dried to remove the free liquid (e.g. water) present in the precipitate and yield a free flowing powder. The drying step is preferably performed below 200° C., e.g. at 150 to 180° C. Drying may be carried out in air or a non-oxidizing atmosphere such as nitrogen or argon. The drying time may be in the range 0.25 to 8 hours, preferably 0.5 to 5 hours. Such drying effectively removes the liquid without causing bulk conversion of the precipitated compounds to crystalline oxides.

The dried precipitate may comprise oxides and/or hydroxides and/or oxy-hydroxides of iron, for example $Fe_2O_3$ and, FeO(OH). $Fe_3O_4$ is generally not present. Preferably the iron compounds in the dried precipitate are generally amorphous as determined, for example, by XRD. Any chromium, copper, manganese, magnesium, zinc and aluminium may also be present as oxides, hydroxides or oxyhydroxides. Carbonate materials may also be present.

The dried precipitate is typically in powder form and may be pelleted and then the pellets calcined, or the dried powder may first be calcined and then the calcined material pelleted. The method for forming the catalyst pellet may therefore comprise the steps of (i) feeding the dried or calcined water gas shift catalyst precursor powder, optionally with a pelleting aid or lubricant such as graphite or magnesium stearate, into a pelleting die, (ii) compressing the powder to form a shaped pellet and recovering the shaped pellet from the pelleting die. Pellet densities may be in the range 1.6-2.2 $g/cm^3$, preferably in the range 1.8-2.2 $g/cm^3$.

It is preferred to perform the calcination step after pelleting because this minimises any hazards associates with dust during the calcination step and the Applicant has found that the dried powder material is easier to pellet than calcined powder material and produces pellets with superior crush strengths.

The calcination step may be performed in air or in an inert or non-oxidising atmosphere such as nitrogen or argon. Calcination under an inert or non-oxidising atmosphere is preferred as it can allow the undesirable Cr(VI) level in Cr-containing catalyst precursors to be reduced to very low levels, e.g. <0.1% by weight. Very low levels of Cr(VI) may also be achieved when calcination is performed in the presence of a small amount of hydrogen, such as 0.1-2% by volume.

Performing the calcination step under a nitrogen atmosphere containing 0-2% by volume hydrogen is particularly preferred. Such hydrogen-assisted calcination does not reduce the one or more iron oxides.

The calcination step is performed at a temperature in the range 400-700° C., preferably at a temperature in the range 400-550° C., and more preferably at a temperature in the range 450-550° C. Calcination times may be in the range 0.1-8 hours, preferably 0.5-4 hours. The calcination of the dried, precipitated composition provided by precipitation method described above provides an oxidic catalyst precursor having the desired pore structure.

Prior to use for the water-gas shift reaction, the catalyst precursor is subjected to reduction conditions wherein the one or more iron oxides, such as haematite $Fe_2O_3$, are reduced using a reducing gas to magnetite ($Fe_3O_4$). Over-reduction of the iron oxides is undesirable. Any chromium trioxide present reduced to the sesquioxide, chromia ($Cr_2O_3$). Any copper, manganese and zinc may also be reduced depending upon the reducing gas and the conditions. This reduction is often carried out in-situ, i.e. in the reactor wherein the water-gas shift reaction is to be effected. Thus typically the catalyst precursor is supplied in an "oxidic" form and reduced to the active form in-situ as part of the catalyst installation. The reduction may be carried out using any reducing gas mixture, e.g. a gas mixture containing hydrogen and/or carbon monoxide under conditions that cause the haematite to be reduced to magnetite. The reduction may conveniently be carried out using synthesis gas. Reduction or activation of the HTS catalyst precursor may suitably be performed at a maximum temperature in the range 420-500° C. and for periods in the range 1-24 hours.

The catalysts of the present invention have higher retained crush strengths,(i.e., the reduced catalyst crush strengths divided by the un-reduced catalyst precursor crush strengths), when compared to un-calcined HTS catalysts. Thus, the retained crush strengths, expressed as a percentage, may be >40%. Reduced crush strengths are preferably >3 kgF, more preferably >4 kgF.

The catalysts are particularly suitable for use in water-gas shift processes operated at inlet temperatures in the range 280-500° C. In such processes, the feed gas is a synthesis gas and the water gas shift reaction enriches the gas in hydrogen and carbon dioxide. The synthesis gas may be any synthesis gas comprising hydrogen and carbon oxides, for example one containing hydrogen, carbon monoxide and carbon dioxide formed by the catalytic steam reforming, autothermal reforming or secondary reforming of hydrocarbon feedstocks such as natural gas or naphtha, or by the gasification of carbonaceous or biomass feedstocks such as coal or biomass. The carbon monoxide content of the synthesis gas fed to the catalyst may be in the range 3-70 mole % on a dry gas basis. For synthesis gas mixtures derived from steam reforming, the carbon monoxide content may be in the range 10-30 mole % on a dry gas basis and for synthesis gas mixtures derived from partial oxidation or gasification, the carbon monoxide content may be in the range 30-70 mole % on a dry-gas basis. By "dry gas basis" we mean the composition of the gas mixture disregarding the steam content.

The synthesis gas requires sufficient steam to allow the water-gas shift reaction to proceed. Whereas synthesis gases derived from processes such as steam reforming may contain sufficient steam, reactive synthesis gases derived from partial oxidation or gasification processes generally are deficient in steam and steam is then preferably added. Where steam addition is required, the steam may be added by direct injection or by another means such as a saturator or steam stripper. The amount of steam should desirably be controlled such that the total steam: synthesis gas (i.e. dry gas) volume ratio in the synthesis gas mixture fed to the catalyst is in the range 0.3:1 to 4:1, preferably in the range 0.3:1 to 2.5:1.

The catalysts of the present invention are particularly suited to high temperature water-gas shift processes operated at inlet temperatures in the range 280-460° C. and especially 320-460° C. Enhanced activity from the catalysts of the present invention may be obtained at inlet temperatures $\geq 400°$ C., especially $\geq 425°$ C. The water-gas shift process is preferably operated adiabatically without cooling of the catalyst bed, although if desired some cooling may be applied for example by passing cooling water under pressure through tubes disposed in the catalyst bed. The exit temperature from the shift vessel is preferably $\leq 600°$ C., more preferably $\leq 550°$ C. to maximise the life and performance of the catalyst. The process is preferably operated at elevated pressure in the range 1-100 bar abs, more preferably 15-50 bar abs.

The process is desirably operated above the dew point to prevent condensation on the catalyst.

The water-gas shift reaction converts the majority of the CO in the synthesis gas mixture to $CO_2$ such that the product gas mixture preferably has a CO content $\leq 10\%$ on a dry gas basis, more preferably $\leq 7.5\%$ by volume on a dry gas basis, most preferably $\leq 5.0\%$ by volume on a dry gas basis, especially $\leq 2.5\%$ by volume on a dry gas basis.

The product gas stream may be used in conventional downstream processes. For example, the product gas stream may be subjected to one or more further shift stages, such as medium temperature shift and/or low-temperature shift over one or more copper catalysts in separate vessels, but this may not be required. Hence, the hydrogen enriched shifted gas, with or without further shifting, may be cooled to a temperature below the dew point so that the steam condenses. The de-watered shifted gas mixture may be fed to methanol, dimethyl ether, Fischer-Tropsch wax, olefin and other chemical syntheses processes, or may be subjected to a stage of $CO_2$-removal to generate a synthesis gas for ammonia synthesis, or a hydrogen stream for the generation of electrical power as part of an IGCC process.

Figure 2:
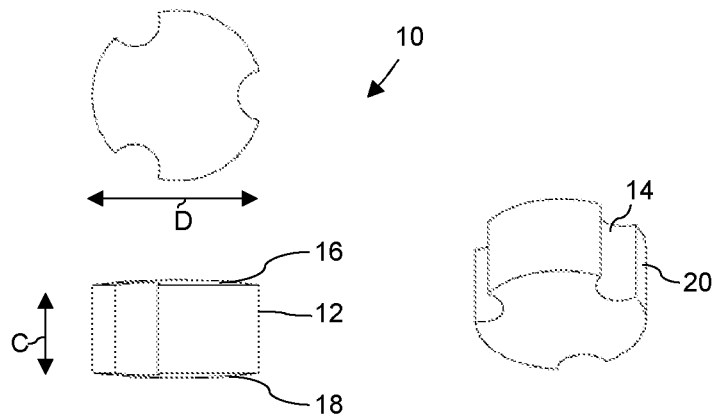
Figure 3:
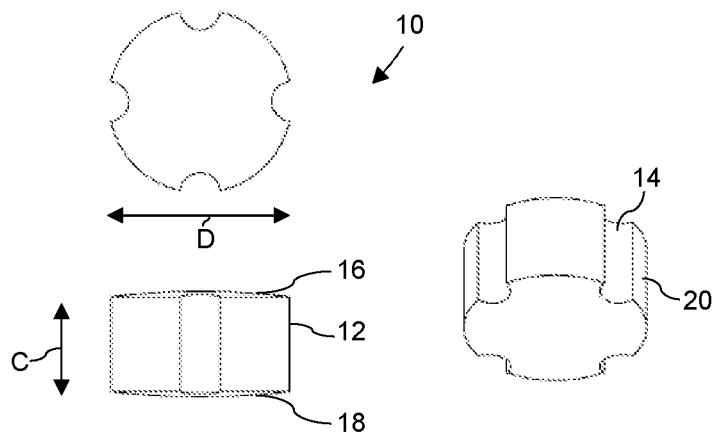
Figure 4:
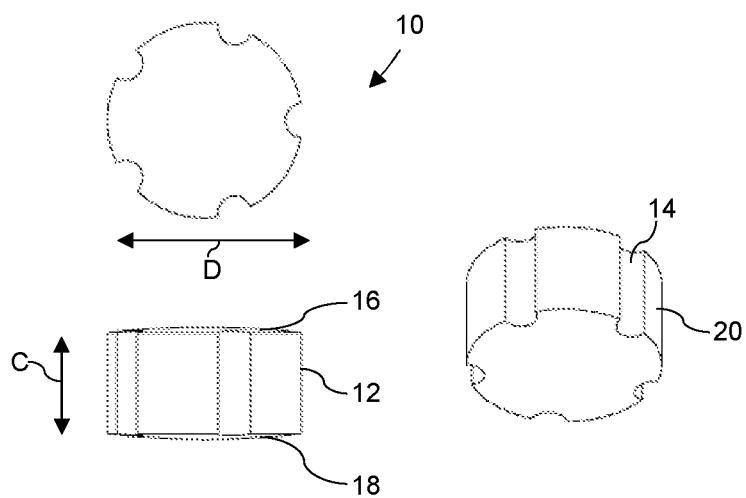

The Invention will now be further described by reference to the drawings in which;

FIG. 1 is a chart depicting the pore size distribution of different catalyst precursors as determined by mercury porosimetry, FIG. 2 is a side view, end view and isomeric depiction of a first catalyst pellet having three flutes, FIG. 3 is a side view, end view and isomeric depiction of a second catalyst pellet having four flutes, FIG. 4 is a side view, end view and isomeric depiction of a third catalyst pellet having five flutes.

FIGS. 2, 3 and 4 together depict water-gas shift catalyst pellets 10 in the form of solid cylinders 12 having a length C and diameter D, which have three, four or five flutes 14 along its length, equally-spaced around the circumferences of the pellets 10. The cylinders 12 have domed ends 16, 18 of lengths A and B. A and B are the same. The flutes 14 create equally sized lobes 20. The evenly spaced flutes are all semi-circular in cross section.

The invention is further illustrated by reference to the following Examples.

Mercury porosomitry was performed using a Micromeritics AutoPore 9520 mercury porosimeter in accordance with ASTM Method D4284-03. Porosimetry Intrusion curves were measured over the pressure range of 0.5 to 60000 psia followed by extrusion down to atmospheric pressure. An equilibration time of 15 seconds was used for each data point on both the intrusion and extrusion curves, the mercury contact angle was taken to be 140° and the mercury surface tension taken as 485 dynes/cm. Samples were dried at 115° C. overnight in an oven prior to analysis. Temperature and pressure effects were compensated for by correction runs on empty penetrometer tubes which were subsequently subtracted from the experimental data.

Loss on Ignition (LOI) measurements were based on the ASTM D7348 method. 3 g of ground catalyst was weighed and heated from ambient (ca 20° C.) to 900° C. in air for 2 hours. After 2 hours' sample was discharged and allowed to cool before re-weighing, so as to provide a weight loss on ignition (LOI). The LOI value is expressed as a percentage of the dry weight before ignition.

Crush strength was determined using the average, or mean, horizontal crush strength (MHCS). Horizontal crush strengths were measured by applying force to the sides of the cylindrical pellets as opposed to the domed ends because this provides a better measure of strength in duty. MHCS measurements were carried out using a calibrated CT-6, ½ tonne desktop mechanical strength testing machine on a number of both fresh and discharged pellets (10 to 20 pellets) selected at random. The standard load range was 0 to 500 kg. For more sensitive readings a 50 kg or 5 kg load cell was fitted.

The pellets were weighed and the diameter and height of the pellets were measured before and after activity testing. From this data the pellet shrinkage and pellet density was calculated. The discharged pellets were first dried overnight at 110° C. to remove any water present before these measurements were taken.

EXAMPLE 1

A solution containing iron, chromium, and copper nitrates in the atomic proportions of 90 Fe:8 Cr:2 Cu and having a total metals concentration of about 2M, was added to a near saturated solution of sodium carbonate while continuously stirring and maintaining the temperature at about 60° C. to precipitate a composition comprising iron, chromium, and copper compounds. Acicular iron oxide particles were added to the sodium carbonate solution to form a slurry before addition of the mixed metals nitrates solution. Addition of the metals solution was stopped when the pH was 3.2. While continuing the stirring, the slurry was allowed to de-gas and then the pH adjusted to 7.2 using 47-50% w/w sodium hydroxide solution. The precipitate was filtered and washed until the sodium content (expressed as $Na_2O$) was below 0.25% by weight. The precipitate was then dried in air at 150° C. to form a dried powder.

The powder composition was pelleted to either a simple flat-ended cylindrical shape or a domed 5-fluted cylindrical shape as depicted in FIG. 4. The powder composition was doped with a small amount of graphite lubricant to aid pellet ejection from the pelleting die and pelleted to a pellet density of about 2.0 $g/cm^3$. The dried, cylindrical pellets are referenced in the following as Comparative 1, and the dried domed fluted-cylindrical pellets are referenced in the following as Comparative 2. The pellets had the following dimensions:

| Example | A mm | B mm | C mm | D mm | (A + B + C)/D | (A + B)/C | Flute size Width/depth (mm) |
|---|---|---|---|---|---|---|---|
| Comparative 1 | — | — | 4.50 | 8.50 | 0.529 | — | — |
| Comparative 2 | 0.25 | 0.25 | 4.50 | 8.50 | 0.588 | 0.111 | 1.8/0.75 |

The dried Comparative 1 pellets were subjected to a post pellet calcination in air at 500-550° C. for 0.5 hours. Upon heating, the stresses caused during calcination resulted in fracturing of the pellets.

The dried Comparative 2 pellets were subjected to a post pellet calcination in either (i) air or (ii) nitrogen, at 500-550° C. for 0.5 hours. In contrast to the cylindrical pellets, the domed, fluted pellets were not fractured by the calcination step. The domed 5-fluted shape was better able to withstand the stresses during calcination than the simple flat ended un-fluted cylinder. The domed fluted catalyst precursor calcined in air is referenced in the following as Example 1(a). The domed fluted catalyst precursor calcined in nitrogen is referenced in the following as Example 1(b). The dimensions of the calcined domed fluted pellets were as follows;

| Example | A mm | B mm | C mm | D mm | (A + B + C)/D | (A + B)/C | Flute size Width/depth (mm) |
|---|---|---|---|---|---|---|---|
| Example 1 (a) | 0.25 | 0.25 | 4.50 | 8.30 | 0.602 | 0.111 | 1.8/0.75 |
| Example 1 (b) | 0.25 | 0.25 | 4.50 | 8.20 | 0.602 | 0.111 | 1.8/0.75 |

For comparison, a calcined co-precipitated high temperature shift catalyst composition was prepared as described above except the precipitation was performed so that the addition of the metals solution was stopped when the pH was 1.4-1.7 and the pH was adjusted, after de-gassing, to 7.6-8.1. The powder composition was pelleted to produce a simple cylindrical shape having the same dimensions as Comparative 1 (length C, 4.50 mm, diameter D, 8.50 mm). The calcined pellet dimensions were length C, 4.50 mm, diameter D, 8.30 mm. This catalyst is referenced in the following as Comparative 3.

The Physical characteristics of the various catalyst precursors was as follows:

| Catalyst Precursor | Comparative 1 | Comparative 2 | Comparative 3 | Example 1a | Example 1b |
|---|---|---|---|---|---|
| Loss on Ignition to 900° C. % wt | 15.09 | 14.08 | 2.05 | 2.51 | 2.43 |
| Pellet Density (g/cm$^3$) | 1.97 | 1.89 | 2.18 | 1.92 | 2.00 |
| Median Pore Diameter (Å) | 365 | 368 | 429 | 960 | 871 |
| Cumulative pore volume (cm$^3$/g) | 0.25 | 0.26 | 0.21 | 0.35 | 0.31 |
| % Portion of pores >60 nm | 2 | 14 | 6 | 82 | 66 |
| % Portion of pores <60 nm | 98 | 85 | 94 | 19 | 35 |
| % retained crush strength | 11 | 12 | 83 | 45 | 54 |
| Volume Shrinkage on reduction (% vol) | 14-15 | 15-18 | 1.8 | 0.2 | 0.0 |

The pore size distributions as determined by mercury porosimetry are depicted in FIG. 1. FIG. 1 clearly shows the distinct profiles for the calcined catalyst precursors of the present invention (Examples 1(a) and (b)) compared to the un-calcined catalyst precursors (Comparatives 1 and 2) and the calcined catalyst precursor formed at a different pH (Comparative 3). Whereas the retained crush strength for Comparative 3 is relatively high compared to Examples 1(a) and (b), it was formed under different pH conditions and so does not have the desired porosity. Moreover, the retained crush strength for the Examples 1(a) and (b) are superior to the un-calcined precursors. Moreover the volume shrinkage in the Examples 1(a) and 1(b) are superior to Comparative 3.

EXAMPLE 2

The catalyst precursor were tested for water-gas shift performance in a multi-reactor laboratory test facility. Each reactor contained a 200 mL diluted catalyst bed volume comprising the catalyst precursor (15 mL) thoroughly mixed with fused alpha-alumina chips (3-5 mm).

The catalyst precursors were reduced in situ using a synthesis gas which was used in the subsequent test procedure. The reduction was performed at a maximum temperature of 460° C. for 4 hours. The same reduction method was used in each case. A catalyst activity was measured by monitoring the CO conversion as the reaction temperature was increased from 350° C.-450° C. All samples were tested under a synthesis gas comprising of 14.0% CO, 6.5% $CO_2$, 55.5% $H_2$, 0.5% $CH_4$ 23.5% $N_2$; at an inlet temperature of 350-450° C., a pressure of 27 barg, and a gas hourly space velocity (GHSV) of 85,000 hr$^{-1}$. The % molar CO conversion was calculated by using an Emerson X-Stream 4 channel IR spectrometer to measure the CO concentration in the dry inlet and outlet gases and determine the volume of CO consumed during the reaction. The results were as follows;

| | CO Conversion (%) | | | | |
|---|---|---|---|---|---|
| Temperature (° C.) | 350 | 375 | 400 | 425 | 450 |
| Comparative 1 | 12 | 15 | 23 | 28 | 32 |
| Comparative 2 | 11 | 21 | 28 | 35 | 39 |
| Comparative 3 | 12 | 18 | 28 | 34 | 37 |
| Example 1(a) | 11 | 15 | 27 | 35 | 42 |
| Example 1(b) | 6 | 17 | 27 | 33 | 38 |

The results demonstrate that the shaped calcined catalysts according to the present invention achieve high CO conversions under these conditions, especially at 425-450° C. The domed 5-fluted shaped in Comparative 2 and in Example 1(a) are superior at 425-450° C. to the simple cylindrical shaped catalysts.

EXAMPLE 3

The effect of catalyst shape was evaluated. Computer modelling of a series of high temperature shift catalysts catalyst was performed Examples 3a-3c relate to the 3-, 4- and 5-fluted domed cylindrical pellets depicted in FIGS. 2, 3 and 4 respectively. Comparative example X is a commercially-available high temperature shift catalyst cylindrical pellet currently widely used. The dimensions of the pellets were as follows;

| Example | A mm | B mm | C mm | D mm | (A + B + C)/D | (A + B)/C | Flute size Width/depth mm |
|---|---|---|---|---|---|---|---|
| Comparative X | 0 | 0 | 4.50 | 8.50 | 0.529 | — | — |
| 3a 3 flutes | 0.25 | 0.25 | 4.50 | 8.50 | 0.588 | 0.111 | 3.1/1.24 |
| 3b 4 flutes | 0.25 | 0.25 | 4.50 | 8.50 | 0.588 | 0.111 | 2.3/0.93 |
| 3c 5 flutes | 0.25 | 0.25 | 4.50 | 8.50 | 0.588 | 0.111 | 1.8/0.75 |

Strength analysis: A COMSOL FEM software package produced simulations to assess the relative strengths of the shaped materials. A total of 10N load was applied vertically along the cross-section of the pellets. The shape was not allowed to be displaced by the applied force and the principle stress was reported along line going through the centre of the pellet shape. (The reported values are those along the weakest plane if the shape has two directional planes). The results were normalised to the comparative example.

Voidage analysis: A DigiPac™ software package was used to simulate the packing of material in a cylindrical bed. The dimensions of the packed bed were set to 170 mm ID and 240 mm length and the simulated voidage was noted at the centre of the bed length to avoid the impacts of the 'end effects'. The resolution used was at 0.2 mm/pixel. The results were normalised to the comparative example.

Simulation of the pellet strength and flow under the same conditions gave the following;

| Example | Relative Crush Strength | Relative Voidage |
|---|---|---|
| X | 1.00 | 1.00 |
| 3a | 0.70 | 1.07 |
| 3b | 1.00 | 1.07 |
| 3c | 1.20 | 1.09 |

The results show the fluted catalyst pellets have a higher voidage (and so improved pressure drop) and for 4 and 5 flutes, the same or better crush strength than the commercially available cylindrical catalyst.

The invention claimed is:

1. A pelletized catalyst precursor comprising haematite having an iron content, expressed as $Fe_2O_3$, of 60 wt % to 95 wt %, wherein the pelletized catalyst precursor has pores, wherein the pores have a pore volume of at least 0.30 $cm^3/g$ and an average pore size in the range of from 60 nm to 140 nm, and wherein the pelletized catalyst precursor (a) exhibits a loss on ignition of less than 3 wt % and (b) when subjected to a reduction step comprising subjecting the pelletized catalyst precursor to a reducing gas sufficient to reduce the haematite to magnetite, exhibits a volume shrinkage of less than 1.5% vol and/or retains at least 40% of its mean horizontal crush strength (MRCS).

2. The pelletized catalyst precursor according to claim 1, further comprising one or more of the metal oxides chromia, alumina, zinc oxide, manganese oxide, magnesium oxide, or copper oxide.

3. The pelletized catalyst precursor according to claim 1, further comprising a particulate support material incorporated in the pelletized catalyst precursor.

4. The pelletized catalyst precursor according to claim 1, wherein at least 50% of the pores have a pore size of at least 60 nm, and/or 40% or less of the pores have a pore size of 60 nm or less.

5. The pelletized catalyst precursor according to claim 1, wherein the pelletized catalyst precursor is shaped as a cylinder with a length C and a diameter D, the diameter defining a circumference of the cylinder, and has two or more flutes running along its length, and optionally has domed ends of lengths A and B, wherein (A+B+C)/D is in the range of 0.25 to 1.25 and, when one or both of A and B are present, (A+B)/C is in the range of 0.03 to 0.3.

6. The pelletized catalyst precursor according to claim 5, wherein (A+B+C)/D is in the range of from 0.50 to 1.00.

7. The pelletized catalyst precursor according to claim 5, wherein (A+B)/C is in the range of from 0.05 to 0.25.

8. The pelletized catalyst precursor according to claim 5, wherein the pelletized catalyst precursor has 3 to 12 equally spaced flutes running axially along its length.

9. The pelletized catalyst precursor according to claim 5, wherein the flutes are semi-circular, elliptical, or U shaped.

10. The pelletized catalyst precursor according to claim 9, wherein 3, 4 or 5 flutes are present that have a width "d" in the range of 0.1D to 0.4D.

11. The pelletized catalyst precursor according to claim 5, wherein each of the two or more flutes has a width, which when taken together provide a total flute width that is 35% or less than the circumference of the cylinder.

12. The pelletized catalyst precursor according to claim 5, wherein the pelletized catalyst precursor has domed ends of lengths A and B, wherein (A+B+C)/D is in the range of 0.25 to 1.25 and (A+B)/C is in the range of 0.03 to 0.3.

13. The pelletized catalyst precursor of claim 1 that exhibits a mean horizontal crush strength (MHCS) of 3 kgF or more when subjected to the reduction step comprising subjecting the pelletized catalyst precursor to the reducing gas sufficient to reduce the haematite to magnetite.

14. The pelletized catalyst precursor of claim 1, wherein the reducing gas is a synthesis gas comprising hydrogen and/or carbon monoxide.

15. The pelletized catalyst precursor of claim 1, wherein the pelletized catalyst precusor exhibits a mean horizontal crush strength (MHCS) of at least 3 kgF after having been subjected to a reduction step comprising subjecting the pelletized catalyst precursor to a reducing gas sufficient to reduce the haematite to magnetite.

16. A method for preparing the pelletized catalyst precursor according to claim 1 comprising the steps of:
(i) adding a solution comprising one or more iron salts to a solution comprising an alkali metal carbonate to form a suspension comprising precipitated iron compounds, until the pH of the suspension is in the range of from 2 to 5,
(ii) adding an alkaline compound to the suspension comprising precipitated iron compounds to raise its pH to at least 7,
(iii) separating the precipitated iron compounds from the suspension,
(iv) washing the separated precipitated iron compounds to remove residual alkali metal salts,
(v) drying the washed precipitate, and either (vi) shaping the dried, washed precipitate by pelleting to form a pellet and then calcining the pellet, or, (vi) calcining the dried, washed precipitate and then shaping the calcined material by pelleting to form a pellet, wherein the calcining step is performed at a temperature in the range of from 400° C. to 700° C.

17. The method according to claim 16, wherein the one or more iron salts comprises iron (II) nitrate, iron (III) nitrate or a mixture thereof.

18. The method according to claim 16, wherein the solution comprising one or more iron salts further comprises a soluble compound of chromium, copper, manganese, magnesium, zinc, or aluminum.

19. The method according to claim 16, wherein the iron salt solution and/or the solution comprising the alkali metal carbonate further comprises a particulate metal oxide support material or a particulate metal hydroxide support material.

20. The method according to claim 19, wherein the particulate support material is spherical or comprises support particles having an aspect ratio of at least 2 and an average length within the range of from 500 nm to 1500 nm.

21. The method according to claim 16, wherein the alkali metal carbonate comprises sodium or potassium carbonate, sodium or potassium hydrogen carbonate, or a mixture thereof.

22. The method according to claim 16, wherein the alkaline compound comprises an alkali metal hydroxide.

23. The method according to claim 16, wherein the pH in step (i) is in the range of from 2 to 4.

24. The method according to claim 16, wherein the pH in step (ii) is in the range of from 7 to 10.

25. The method according to claim 16, wherein the washing is performed to reduce the alkali metal content (expressed as alkali metal oxide) of the dried precipitate to 0.25% by weight or less.

26. The method according to claim 16, wherein the drying is performed below 200° C.

27. The method according to claim 16, wherein the calcining is performed at a temperature in the range of from 400° C. to 550° C.

28. The method according to claim 16, wherein the drying and/or calcining are performed under a non-oxidising atmosphere.

29. The method according to claim 28, wherein the non-oxidising atmosphere is nitrogen or argon, optionally containing 0.1-2% by volume hydrogen.

30. A water gas shift catalyst comprising the pelletized catalyst precursor according to claim 1, wherein at least a portion of the haematite is reduced to magnetite.

31. A method for making a catalyst suitable for use in a water-gas shift process comprising reducing the pelletized catalyst precursor prepared according to the method of claim 16 using a reducing gas comprising hydrogen and/or carbon monoxide to provide a catalyst wherein at least a portion of the one or more oxides of iron are reduced to magnetite.

32. A process for increasing the hydrogen content of synthesis gas mixture comprising hydrogen, carbon oxides and steam, comprising the step of passing the synthesis gas mixture at an inlet temperature in the range of from 280° C. to 500° C. over the water-gas shift catalyst according to claim 30 to form a hydrogen-enriched shifted gas mixture.

\* \* \* \* \*